(No Model.)

S. M. COLE.
MEASURING PUMP.

No. 324,301. Patented Aug. 11, 1885.

WITNESSES:
R. C. Masi
John T. Morrow

INVENTOR
S. M. Cole,
BY Anderson & Smith
his ATTORNEYS.

UNITED STATES PATENT OFFICE.

SHERMAN M. COLE, OF ANAMOSA, IOWA.

MEASURING-PUMP.

SPECIFICATION forming part of Letters Patent No. 324,301, dated August 11, 1885.

Application filed November 15, 1884. (No model.)

*To all whom it may concern:*

Be it known that I, SHERMAN M. COLE, a citizen of the United States, residing at Anamosa, in the county of Jones and State of Iowa, have invented certain new and useful Improvements in Measuring-Pumps; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
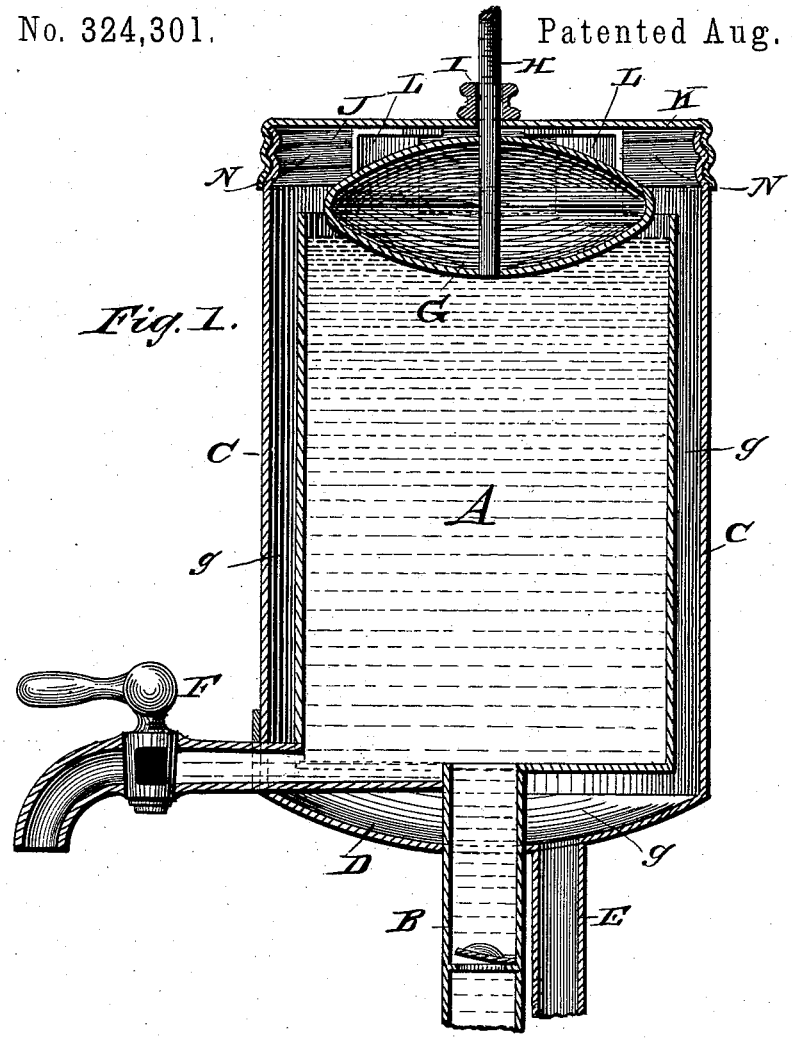
Figure 2:
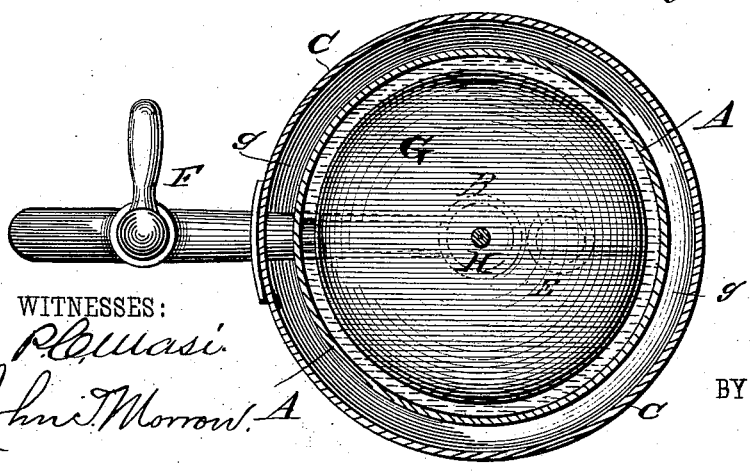

Figure 1 of the drawings is a vertical sectional view of my device, and Fig. 2 is a horizontal sectional view of the same.

This invention has relation to measuring-pumps; and it consists in the construction and novel arrangement of devices forming an improvement on the invention for which Letters Patent were granted to me on the 2d day of January, 1883, and the 8th day of April, 1884, as hereinafter set forth, and pointed out in the appended claim.

In the annexed drawings, the letter A designates a measuring-receptacle, to the base of which is connected a tube, B, which communicates with the pump-barrel. This tube is usually provided with a valve opening upward. Inclosing this measure A is a cylinder or vessel, C, the bottom D of which is made concave or funnel form so that the drip which falls therein will be conducted by the return-pipe E either back to the vessel from which the oil or other liquid is being pumped or to some other receiver. An interval, $g$, is left between the measure A and the inclosing-vessel C at the bottom and sides, as shown. A faucet, F, is attached to the measure A at its lower end, and is cut away to abut against the bottom and side walls thereof, so that a full opening into the faucet is provided and a free flow of the liquid facilitated. The inclosing vessel C is firmly secured to the faucet.

G represents the float, which is located in the measure A, and rises with the liquid which is pumped into said measure. This float is usually provided with a graduated stem, H, which projects upward through an aperture, I, in the top J of the vessel C, and serves to indicate the amount of liquid in the measure.

K represents a screw-cap, which is placed on the vessel C, and L L are extensions of the side wall of the measure A, which reaches upward to the under side of the cap when the latter is in position between the extensions L L and the intervals N N through which the liquid flows, when the measure is full, into the outside vessel, C, and downward through the escape or return pipe E. These extensions L L may be made separate from the side wall of the measure, and may be fastened to the under side of the screw-cap. They serve in either case to steady the top of the measure and to form guides for the float when at its highest position and prevent it from being caught in its descent. In this construction the air-supply and air-vent are provided by the pipe E, and the screw-cap serves to obviate evaporation to a large extent. It also prevents the measure from being strained by over-pumping.

In making the measure A the displacement of the float is taken into consideration. For instance, if it is a gallon measure, its capacity must be as much more than a gallon as the amount of liquid which the float displaces, so that an exact gallon will be insured in the measure, notwithstanding the space taken up by the float.

The graduated scale-rod H should be made to pass through an aperture just large enough to allow it to pass freely.

Having described this invention, what I claim, and desire to secure by Letters Patent, is—

In a device for elevating and measuring oils and other liquids, the combination, with the measure having a discharging-faucet and a float therein having a graduated stem, of the inclosing-vessel C, having a screw-cap and return-tube, and the guides L at the top of the side wall of the measure, substantially as specified.

In testimony whereof I affix my signature in presence of two witnesses.

SHERMAN M. COLE.

Witnesses:
   C. M. BROWN,
   R. L. LEACH.